United States Patent
Powers et al.

(10) Patent No.: US 6,615,182 B1
(45) Date of Patent: Sep. 2, 2003

(54) SYSTEM AND METHOD FOR DEFINING THE ORGANIZATIONAL STRUCTURE OF AN ENTERPRISE IN A PERFORMANCE EVALUATION SYSTEM

(75) Inventors: Michael C. Powers, Irving, TX (US); Douglas A. Sudberry, Grapevine, TX (US); James A. Eiler, Irving, TX (US); Robert S. Bennett, Franklin, TN (US); Clifford R. Phillips, Bedford, TX (US)

(73) Assignee: e-talk Corporation, Irving, TX (US)

( * ) Notice: Subject to any disclaimer, the term of this patent is extended or adjusted under 35 U.S.C. 154(b) by 0 days.

(21) Appl. No.: 09/110,106

(22) Filed: Jul. 1, 1998

Related U.S. Application Data

(60) Provisional application No. 60/084,794, filed on May 8, 1998.

(51) Int. Cl.⁷ ............................................. G06F 17/60
(52) U.S. Cl. .................. 705/7; 705/8; 705/9; 705/11; 709/1; 709/2; 709/9; 709/10
(58) Field of Search .................... 705/1, 7, 9, 8, 705/11, 12; 709/1, 2, 9, 10

(56) References Cited

U.S. PATENT DOCUMENTS

| | | | | |
|---|---|---|---|---|
| 4,476,535 A | | 10/1984 | Loshing et al. | 364/480 |
| 4,764,867 A | * | 8/1988 | Hess | 395/356 |
| 5,017,917 A | * | 5/1991 | Fisher et al. | 340/14.1 |
| 5,172,313 A | * | 12/1992 | Schumacher | 705/7 |
| 5,233,513 A | * | 8/1993 | Doyle | 705/7 |
| 5,241,621 A | | 8/1993 | Smart | 395/51 |
| 5,321,621 A | | 6/1994 | Sainen | 364/470 |
| 5,349,663 A | * | 9/1994 | Bailey | 707/100 |
| 5,406,477 A | * | 4/1995 | Harhen | 395/500.27 |
| 5,493,489 A | * | 2/1996 | Tamaki et al. | 705/8 |
| 5,500,795 A | | 3/1996 | Powers et al. | 364/401 |
| 5,551,880 A | | 9/1996 | Bonnstetter et al. | |
| 5,617,342 A | * | 4/1997 | Elazouni | 395/500.27 |
| 5,630,069 A | * | 5/1997 | Flores et al. | 705/7 |
| 5,655,118 A | * | 8/1997 | Heindel et al. | 707/103 |
| 5,675,745 A | * | 10/1997 | Oku et al. | 705/7 |
| 5,684,964 A | | 11/1997 | Powers et al. | 395/211 |
| 5,726,914 A | | 3/1998 | Janovski et al. | |
| 5,734,837 A | * | 3/1998 | Flores et al. | 705/7 |
| 5,784,452 A | | 7/1998 | Carney | |
| 5,799,286 A | * | 8/1998 | Morgan et al. | 705/30 |
| 5,809,131 A | * | 9/1998 | Ichikawa et al. | 705/7 |
| 5,812,135 A | * | 9/1998 | Kotchey | 345/356 |
| 5,909,669 A | | 6/1999 | Havens | |
| 6,088,679 A | * | 7/2000 | Barkley | 705/8 |
| 6,298,349 B1 | * | 10/2001 | Toyoshima et al. | 345/853 |

FOREIGN PATENT DOCUMENTS

| | | |
|---|---|---|
| EP | 0 587 290 A2 | 7/1993 |
| EP | 0 644 510 A2 | 9/1994 |
| GB | 2221068 A | 1/1990 |
| WO | WO 97/31320 | 8/1997 |

OTHER PUBLICATIONS

Search Report re: PCT/ US 99/ 10143, Sep. 16, 1999.

Teknekron Infoswitch Corporation, "P&Q Review!™ Productivity and Quality Performance Evaluation, Getting Started Guide," Version 2 #151–0801–002, Jun. 1995.

(List continued on next page.)

*Primary Examiner*—V. Millin
*Assistant Examiner*—Jagdish N Patel
(74) *Attorney, Agent, or Firm*—Baker Botts L.L.P.

(57) ABSTRACT

An organizational structure of an enterprise is defined in a performance evaluation system by storing a plurality of user-defined levels. A user-defined hierarchy is stored for the levels. A plurality of user-defined members are also stored. Each member is associated with a level. The performance evaluation system is operable to generate the organizational structure of the enterprise based on the user-defined levels, hierarchy, and members.

17 Claims, 9 Drawing Sheets

OTHER PUBLICATIONS

Prof. Dr. A.W. Scheer and A. Hars, "From CIM to Enterprise–Wide Data Modeling," ICCIM '91 Proceedings of the International Conference on Computer Integrated Manufacturing, Singapore, pp. 89–92, Oct. 2–4, 1991.

R.L. Katz, "Business/enterprise modeling," IBM Systems Journal, Armonk, New York, vol. 29, No. 4, pp. 509–525, 1990.

Hunter, William C; "Internal organization and economic performance: The case of large U.S. commercial banks" Economic Perspectives (Federal Reserve Bank of Chicago) v19n5 pp: 10–20, Sep. 1995.*

Halachmi et al.; "Performance measurement, organizational technology and organizational design", Work Study v43n3 pp: 19–25, May 1994.*

Louis et al., Determinants of business process reengineering success in small and large enterprises: .. , Journal of Small Business Management vol.:36 p.: 72(14p). Jan. 01, 1998.*

Hebeler et al; Unfettered leverage: the ascendancy of knowledge–rich products and processes., Business Horizons vol.: v40 Issue: n4, Jul. 1, 1997.*

* cited by examiner

PRIVLEGES TABLES

USER VIEW TABLE (140)

| USER ID | LEVEL/MEMBER | TYPE | ALLOWED |
|---|---|---|---|
| USER 1 | COMPANY | L | Y |
| USER 1 | SERVICE GROUP | L | Y |
| USER 1 | TECHNICAL GROUP | L | Y |
| USER 1 | SALES GROUP | L | Y |
| USER 1 | PRODUCT A TEAM | L | Y |
| USER 1 | PRODUCT B TEAM | L | Y |
| USER 1 | MEMBER 11 | M | Y |
| ⋮ | ⋮ | ⋮ | ⋮ |
| USER 1 | MEMBER 37 | M | Y |
| USER 10 | COMPANY | L | N |
| USER 10 | SERVICE GROUP | L | Y |
| USER 10 | MEMBER 11 | M | Y |
| USER 10 | MEMBER 12 | M | Y |
| ⋮ | ⋮ | ⋮ | ⋮ |
| USER 35 | COMPANY | L | N |
| USER 35 | SALES GROUP | L | N |
| USER 35 | PRODUCT A TEAM | L | Y |
| USER 35 | MEMBER 36 | M | Y |
| USER 35 | MEMBER 37 | M | Y |

CLASS OF SERVICE ASSIGNMENT TABLE (142)

| USER ID | SERVICE TEMPLATE ID |
|---|---|
| USER 1 | ADMIN TEMPLATE |
| USER 10 | GROUP TEMPLATE |
| ⋮ | ⋮ |
| USER 35 | PRODUCT B TEMPLATE |

CLASS OF SERVICE TEMPLATE TABLE (144)

| SERVICE TEMPLATE ID | USER ID | SERVICES | | | | | |
|---|---|---|---|---|---|---|---|
| ADMIN TEMPLATE | | Y | Y | Y | Y | Y | Y |
| GROUP TEMPLATE | | Y | N | Y | N | Y | N |
| TEAM TEMPLATE | | N | Y | N | Y | Y | N |

*FIG. 4*

PERFORMANCE AREA TABLES

GUIDELINE TABLE

| GUIDELINE ID |
|---|
| SERVICE GROUP |
| TECHNICAL GROUP |
| PRODUCT A TEAM |
| PRODUCT B TEAM |

162

PERFORMANCE AREAS TABLE

| PERFORMANCE AREA ID |
|---|
| PERFORMANCE AREA 1 |
| PERFORMANCE AREA 2 |
| PERFORMANCE AREA 3 |
| PERFORMANCE AREA 4 |
| PERFORMANCE AREA 5 |
| PERFORMANCE AREA 6 |

154

PERFORMANCE AREA ASSIGNMENT TABLE

| GUIDELINE ID | PERFORMANCE AREA ID |
|---|---|
| SERVICE GROUP | PERFORMANCE AREA 1 |
| SERVICE GROUP | PERFORMANCE AREA 2 |
| TECHNICAL GROUP | PERFORMANCE AREA 1 |
| TECHNICAL GROUP | PERFORMANCE AREA 3 |
| PRODUCT A TEAM | PERFORMANCE AREA 1 |
| PRODUCT A TEAM | PERFORMANCE AREA 4 |
| PRODUCT A TEAM | PERFORMANCE AREA 5 |
| PRODUCT B TEAM | PERFORMANCE AREA 1 |
| PRODUCT B TEAM | PERFORMANCE AREA 4 |
| PRODUCT B TEAM | PERFORMANCE AREA 6 |

164

QUESTION TABLE

150

| QUESTION ID | TITLE | TEXT | WEIGHT |
|---|---|---|---|
| QUESTION 1 | SCHEDULE ADHERENCE | HOW OFTEN DOES THE AGENT WORK TO ORIGINALLY ASSIGNED SHIFT? | 3 |
| QUESTION 2 | PROMPTNESS | HOW OFTEN IS THE AGENT LATE FOR WORK? | 4 |
| ○○○ | ○○○ | ○○○ | ○○○ |
| QUESTION 10 | ATTENDANCE | HOW OFTEN DOES THE AGENT MISS WORK? | 5 |

*FIG. 5A*

PERFORMANCE AREA TABLES

QUESTION ASSIGNMENT TABLE

| PERFORMANCE AREA ID | QUESTION ID |
|---|---|
| PERFORMANCE AREA 1 | QUESTION 1 |
| PERFORMANCE AREA 1 | QUESTION 2 |
| PERFORMANCE AREA 2 | QUESTION 3 |
| PERFORMANCE AREA 2 | QUESTION 4 |
| PERFORMANCE AREA 3 | QUESTION 3 |
| PERFORMANCE AREA 3 | QUESTION 5 |
| PERFORMANCE AREA 4 | QUESTION 3 |
| PERFORMANCE AREA 4 | QUESTION 6 |
| PERFORMANCE AREA 5 | QUESTION 7 |
| PERFORMANCE AREA 5 | QUESTION 8 |
| PERFORMANCE AREA 6 | QUESTION 9 |
| PERFORMANCE AREA 6 | QUESTION 10 |

156

ANSWER TYPES TABLE

| QUESTION ID | ANSWER ID | ATTRIBUTES |
|---|---|---|
| QUESTION 1 | ANSWER 1 | |
| QUESTION 1 | ANSWER 2 | |
| ⋮ | ⋮ | ⋮ |
| QUESTION 10 | ANSWER 1 | |

152

EXPRESSION ASSIGNMENT TABLE

| PERFORMANCE AREA ID | EXPRESSION ID |
|---|---|
| PERFORMANCE AREA 1 | EXPRESSION 1 |
| PERFORMANCE AREA 2 | EXPRESSION 2 |
| ⋮ | ⋮ |
| PERFORMANCE AREA 6 | EXPRESSION 1 |

160

EXPRESSION TABLE

| EXPRESSION ID | EXPRESSION |
|---|---|
| EXPRESSION 1 | |
| EXPRESSION 2 | |
| ⋮ | ⋮ |
| EXPRESSION 6 | |

PRODUCTIVITY TABLE 168

| MEMBER ID | DATE | DATA ELEMENT ID | VALUE |
|---|---|---|---|
| MEMBER 11 | 5/11/98 | DATA ELEMENT 1 | |
| MEMBER 12 | 5/11/98 | DATA ELEMENT 1 | |
| MEMBER 21 | 5/11/98 | DATA ELEMENT 2 | |
| ⋮ | ⋮ | ⋮ | ⋮ |
| MEMBER 37 | 5/11/98 | DATA ELEMENT 10 | |

DATA ELEMENT TABLE 166

| DATA ELEMENT ID |
|---|
| DATA ELEMENT 1 |
| DATA ELEMENT 2 |
| ⋮ |
| DATA ELEMENT 10 |

*FIG. 6*

IMPORT TEMPLATE TABLE 174

| IMPORT TEMPLATE ID | PREPROCESSOR | DELIMITER |
|---|---|---|
| IMPORT TEMPLATE 1 | | |
| IMPORT TEMPLATE 2 | | |
| ⋮ | ⋮ | ⋮ |
| IMPORT TEMPLATE 5 | | |

CONFIGURATION TABLE 170

| COLUMN NO | NAME | TYPE | FORMAT | DATA ELEMENT ID |
|---|---|---|---|---|
| 1 | | | | |
| 2 | | | | |
| 3 | | | | |
| 4 | | | | |
| 5 | | | | |

IMPORT TEMPLATE ASSIGNMENT TABLE 172

| CONFIGURATION ID | IMPORT TEMPLATE ID |
|---|---|
| CONFIGURATION 1 | IMPORT TEMPLATE 1 |
| ⋮ | ⋮ |
| CONFIGURATION 10 | IMPORT TEMPLATE 10 |

*FIG. 7*

FILTER TABLE 210

| FILTER ID | PLANS SELECTED | DATES SELECTED VALUES | DATA SELECTED VALUES | AVERAGES SELECTED VALUES | KEYWORDS SELECTED | SAMPLE SIZE SELECTED VALUES |
|---|---|---|---|---|---|---|
| FILTER 1 | | | | | | |
| FILTER 2 | | | | | | |
| ... | ... | ... | ... | ... | ... | ... |
| FILTER 10 | | | | | | |

FIG. 9

SYSTEM AND METHOD FOR DEFINING THE ORGANIZATIONAL STRUCTURE OF AN ENTERPRISE IN A PERFORMANCE EVALUATION SYSTEM

RELATED APPLICATIONS

This application claims the benefit of U.S. Provisional Application Serial No. 60/084,794, entitled "METHOD AND SYSTEM FOR DETERMINING THE PERFORMANCE OF A CALL CENTER AGENT,", filed May 8, 1998, which is hereby incorporated by reference.

This application is related to copending U.S. patent application Ser. No. 09/110,108 entitled "SYSTEM AND METHOD FOR GENERATING AN EVALUATION IN A PERFORMANCE EVALUATION SYSTEM"; copending U.S. patent application Ser. No 09/110,109 entitled "SYSTEM AND METHOD FOR PROVIDING ACCESS PRIVILEGES FOR USERS IN A PERFORMANCE EVALUATION SYSTEM"; copending U.S. patent application Ser. No. 09/110,103, entitled "SYSTEM AND METHOD FOR IMPORTING PERFORMANCE DATA INTO A PERFORMANCE EVALUATION SYSTEM"; and copending U.S. patent application Ser. No. 09/110,107 entitled "SYSTEM AND METHOD FOR GENERATING RESULTS IN A PERFORMANCE EVALUATION SYSTEM".

TECHNICAL FIELD OF THE INVENTION

This invention relates generally to evaluation tools, and more particularly to a system and method for defining the organizational structure of an enterprise in a performance evaluation system.

BACKGROUND OF THE INVENTION

Evaluation tools are used to gather and record productivity and quality statistics for a business or other organization. Analysis of such information allows inefficiencies and other problems of the business to be identified and corrected. In this way, business performance is maximized.

Traditionally, evaluation tools are implemented on stand-alone systems that are unable to effectively communicate with other resources in a network environment. Other problems include the use of predefined organizational structures that cannot be modified to match the organizational structure of a business. In addition, privileges, evaluations, and reports are generally hard-coded for each evaluation tool. Such customization leads to high implementation and administration cost.

SUMMARY OF THE INVENTION

In accordance with the present invention, a performance evaluation system is provided that substantially eliminates or reduces disadvantages or problems associated with the previously developed systems. In particular, the present invention provides a performance evaluation system in which the organizational structure of an enterprise is accurately defined to custom fit quality and productivity tools to the structure of the enterprise.

In one embodiment of the present invention, the organizational structure of an enterprise is defined in a performance evaluation system by storing a plurality of user-defined levels. A user-defined hierarchy is stored for the levels. A plurality of user-defined members are also stored. Each member is associated with a level to define the organizational structure of the enterprise. The performance evaluation system may generate a user view based on the user-defined levels, hierarchy and members and the assignment of members to levels.

More specifically, in accordance with one embodiment of the present invention, the user-defined levels are stored by listing the levels in a first database table. In this embodiment, the user-defined hierarchy is stored in a second database table. The hierarchy includes an assignment for each lower level in the hierarchy to a higher level in the hierarchy. The user-defined members are stored by listing the members in a third database table. The members are each associated with a level by storing a user-assigned level for the members in the third database table.

Technical advantages of the present invention include providing an improved performance evaluation system. In particular, the performance evaluation system uses a web-base architecture that allows performance evaluation methodology to be standardized throughout an enterprises In addition, users can take advantage of the Internet or other network to remotely access the performance evaluation system and complete member evaluations. Members can also remotely track their progress.

Another technical advantage of the present invention includes providing a performance evaluation system that can be customized to fit the organizational structure of an enterprise. In particular, users may define levels and a hierarchy for the levels within the performance evaluation system that match that of the enterprise. As a result, quality and productivity tools are customized to fit the structure of the enterprise.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings in which:

FIG. 4 illustrates details of the privilege tables of FIG. 1 in accordance with one embodiment of the present invention;

FIG. 5 illustrates details of the plan tables of FIG. 1 in accordance with one embodiment of the present invention;

FIG. 6 illustrates details of the productivity tables of FIG. 1 in accordance with one embodiment of the present invention;

FIG. 7 illustrates details of the data import tables of FIG. 1 in accordance with one embodiment of the present invention;

FIG. 9 illustrates details of the filter tables of FIG. 1 in accordance with one embodiment of the present invention.

DETAILED DESCRIPTION OF THE INVENTION

Figure 1:
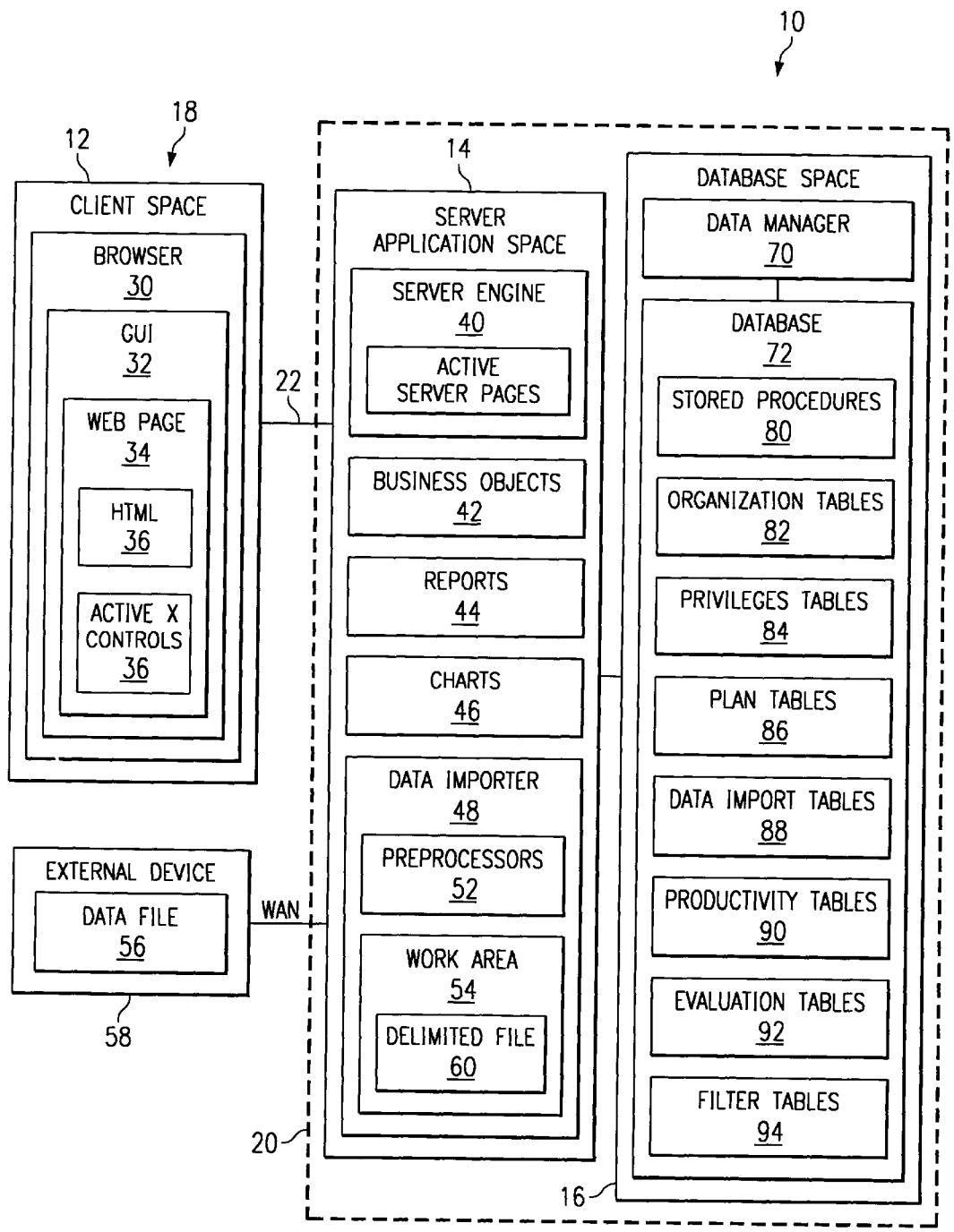
FIG. 1 is a block diagram illustrating a performance evaluation system in accordance with one embodiment of the present invention.

FIG. 1 illustrates a performance evaluation system 10 in accordance with one embodiment of the present invention.

As described in more detail below, the performance evaluation system 10 uses productivity and quality data to evaluate the performance of an individual, group, process or other suitable type of item or operation.

Referring to FIG. 1, the performance evaluation system 10 is deployed on a three-tiered architecture. The three-tiered architecture includes client space 12, server application space 14 and database space 16. The client space 12 is implemented on a client platform 18 such as a work station, personal computer or other device capable of communicating between a user and a server. The server application and database spaces 14 and 16 are implemented on a server platform 20 such as a personal computer or other device capable of being remotely accessed over a network.

The client and server platforms 18 and 20 are connected by a network 22. The network 22 may comprise the Internet or other wide area network (WAN), an enterprise intranet or other a local area network (LAN), or other suitable type of link capable of communicating data between the client and server platforms 18 and 20.

The client space 12 includes a web-browser 30 having a graphical user interface (GUI) 32. The graphical user interface 32 displays web pages 34 downloaded over the network 22 from the server application space 14. The web pages 34 may use HTML or Active X controls 36. The Active X controls 34 provide a rich interface 32 with superior scripting control.

The server application space 14 includes a server engine 40, business objects 42, reports 44, charts 46, and a data importer 48. The server engine 40 includes active server pages (ASP) 50 that include server-side components and scripting. The server-side components are specialized Active X components executed prior to delivery of web pages to the client space 12. The server-side scripting accesses the interfaces of the server-side components. Use of the active server pages 50 allows the web pages to be updated in response to changing system and database settings.

The business objects 42 call stored procedures in the database space 16 and perform preprocessing and expressions processing functions. In a particular embodiment, the business objects 42 include an organization object, a plan object, an evaluation object, an import service object, and a results object. In this embodiment, the organization object provides an interface for basic organizational functionality. The organization object also provides an interface to a class of services table giving the client space 12 access to allowed functions. The plan object provides an interface for the manipulation and use of evaluation guidelines. The evaluation object provides interfaces for performing evaluations. The import service object schedules and retrieves external data and places it into a delimited file. The import service object also provides a basic interface to the configuration settings. The results object receives information from the client space 12 for selecting reports based on the requested filters. Each of the objects may comprise one or more objects.

The reports 44 may include both detail and summary reports. The detail reports provide information for members and elements of each member. In a particular embodiment, the detail reports include a productivity and quality report, a quality evaluation report, a productivity analysis report, a quality question report, a productivity element report, and a detail evaluation report. The productivity and quality report presents actual scores, maximum scores, and percentages of maximum for both quality and productivity by an evaluation date for each member with group averages for all hierarchical levels. The quality evaluation report presents notes, actual scores, maximum score, and percentages of maximum for each question of an evaluation with subtotals by performance areas, evaluation, member, and any additional hierarchical levels. The productivity analysis report presents actual scores, maximum score, and percentage of maximum for each equation of productivity analysis with subtotals by member and by any additional hierarchical levels. The quality and question report presents actual scores for each question along with the total actual score, maximum score, and percentage of maximum for each performance area with subtotals by evaluation, member, and any additional hierarchical levels. The productivity element report presents actual data along with the equation-produced actual score, maximum score, and percentage of maximum for each element of productivity data with subtotals by member and any additional hierarchical levels. The detail evaluation report presents evaluation date, time, and status of all evaluations for a member subtotal by status, date, member, and evaluator.

The summary reports provide average scores for a particular member or level. In a particular embodiment, the summary reports include a productivity and quality report, a quality evaluation report, a productivity analysis report, a quality question report and a productivity and quality comparison report. The productivity and quality report presents average scores for both quality and productivity for each member with group averages for all hierarchical levels. The quality evaluation report presents average scores by performance areas, evaluation, member, and any additional hierarchical levels. The productivity analysis report presents average scores for each equation of productivity data with subtotals by member and any additional hierarchical levels. The quality question report presents the total score for each question and the percentage of maximum scores for each performance area. The productivity and quality comparison report presents average scores, maximum scores and percentage of maximum for both quality and productivity by member with comparison averages for a chosen hierarchical level. Additional detail and summary reports can be created by selecting various categories of information.

The charts 46 display graphic and textual information useful in determining the overall performance of a member and identifying ways to improve that performance. In a particular embodiment, the charts 46 include sets of productivity and quality charts, productivity charts and quality charts. The productivity and quality charts plot productivity and quality scores for date, member, users and hierarchical levels. The productivity charts present productivity data plotted against time for members, users, and other hierarchical levels. The quality charts present quality data plotted against time for members, users, questions and hierarchical levels.

The data importer 48 imports productivity data from external sources such as a telephony switch. The data importer 48 includes preprocessors 52 and a work area 54. The preprocessors 52 are tools used to create an instruction file for interpreting the information in a data file. The instruction files are operable to parse data files. In one embodiment, the preprocessors 52 include Nortel Datastream, Rockwell Spectrum IMS, and Monarch. The Nortel Datastream preprocessor is used for converting Nortel Datastream report information into a delimited format. The Rockwell Spectrum IMS preprocessor is used for converting Rockwell report information. The Monarch preprocessor can be used to create custom preprocessors. Accordingly, the performance evaluation system 10 can be configured to import any type of suitable data file 56 from an external device 58.

The preprocessors 52 create a delimited file 60 from a data file 56. In the delimited file 60, columns of data are each separated by a delimiter character such as a comma, hyphen, colon, and the like. The delimiter acts as reference point telling the data importer 48 where one column of data stops and a new column starts. If the data file 56 is already in a delimited format, a preprocessor 52 is not used.

The delimited file 60 is a temporary file stored in the work area 54. As described in more detail below, the delimited file 60 is moved to the database space 16 and the productivity data mapped into the database based on the configuration defined in the database. Accordingly, the evaluation process is streamlined by having data in a central location for analysis.

The database space 16 includes a database manager 70 and a database 72. The database manager 70 calls stored procedures 80 to access the database 72. The stored procedures 80 are a precompiled collection of SQL statements and optional control-of-flow statements stored under a name and processed as a unit. The stored procedures 80 are stored within a database 72, can be executed with one call from the database manager 70, and allow user-declared variables, conditional executions, and other programming features.

In addition to the stored procedures 80, the database 72 includes organization tables 82, privileges tables 84, plans tables 86, data import tables 88, productivity tables 90, evaluation tables 92 and filter tables 94. As described in more detail below, the organization tables 82 allow an enterprise to set up the performance evaluation system 10 to correspond to its organizational structure. The privileges tables 84 store user access privileges based on views of the organizational structure and on class of services. The plan tables 86 store questions, performance areas, and guidelines for generating performance evaluations in the performance evaluation system 10. The data import tables 88 store configurations for importing productivity data into the performance evaluation system 10. The productivity tables 90 store productivity data for members of the performance evaluation system 10. The evaluation tables 92 store responses and scores for completed evaluations. The filter tables 94 store filters for sorting data and displaying results in the reports 44 and charts 46.

In a particular embodiment, the client and server platforms 18 and 20 are each a personal computer connected via the Internet. In this embodiment, the client and server 18 and 20 may each operate using MICROSOFT WINDOWS NT version 4.0 that provides TCP/IP connectivity over the Internet. The web-browser 30 may be Internet Explorer 3.2× or higher. The server engine 40 may be Internet Information Server 3.0 or higher. The database may be a relational database and the database manager 70 an SQL Server 6.5.

The web-base architecture of the performance evaluation system 10 allows performance evaluation methodology to be standardized throughout an enterprise. In addition, users can take advantage of the Internet or other network to remotely access the performance evaluation system and complete member evaluations. Members can also remotely track their progress.

Figure 2:
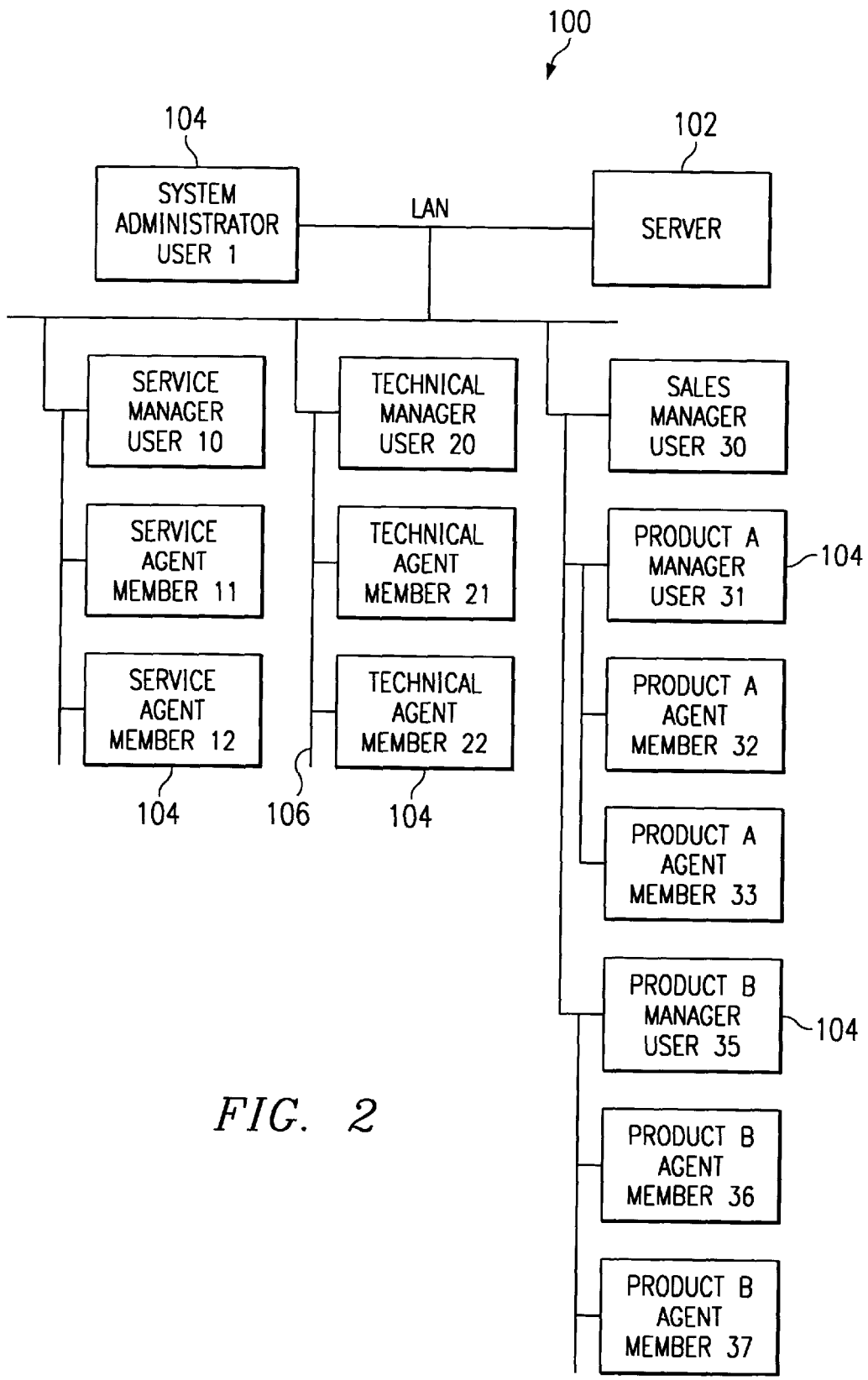
FIG. 2 is a block diagram illustrating an example call center using the performance evaluation system of FIG. 1.

FIG. 2 illustrates an exemplary call center 100 using the performance evaluation system 10. Although the performance evaluation system 10 will be described in connection with the exemplary call center 100, it will be understood that the performance evaluation system 10 may be used for other types of enterprises, including other types of companies, businesses, groups, and organizations.

Referring to FIG. 2, the call center 100 includes a server 102 connected to a plurality of clients 104 through a local area network (LAN) 106. The call center 100 includes a system administrator (user 1), a service manager (user 10), a technical manager (user 20), a sales manager (user 30), a product A manager (user 31), and a product B manager (user 35). Service agents (members 11 and 12) report to the service manager. Technical agents (members 21 and 22) report to the technical manager. Product A agents (members 32 and 33) report to the product A manager. Product B agents (members 36 and 37) report to the product B manager. In addition, the product A and B managers report to the sales manager.

Figure 3:
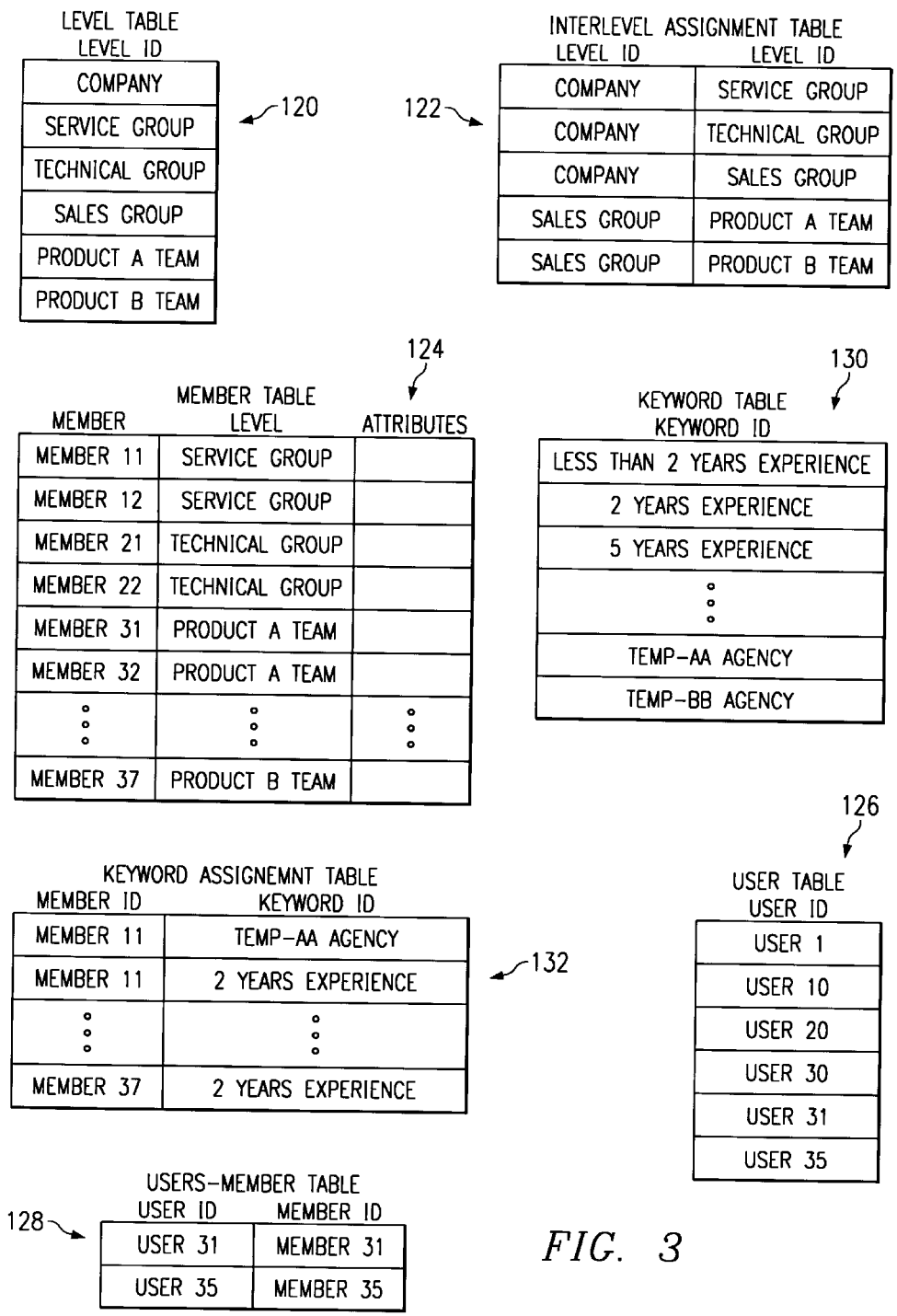
FIG. 3 illustrates details of the organization tables of FIG. 1 in accordance with one embodiment of the present invention.

FIG. 3 illustrates details of the organization tables 82. The organization tables 82 allow an enterprise to set up the performance evaluation system 10 to fit the organizational structure of the enterprise. Thus, the organization tables 82 may store any number of user-defined levels in any user-defined hierarchy. In this way, quality and productivity tools are customized for the enterprise.

Referring to FIG. 3, the organization tables 82 include a level table 120, an interlevel assignment table 122, member tables 124, a user table 126, a user-member table 128, a keyword table 130, and a keyword assignment table 132. The level table 120 lists all the levels of the enterprise by a level ID. The levels are a collection of members who can be grouped together. The level IDs may be any suitable identifier operable to uniquely identify the levels. For the call center 100 of FIG. 2, the levels are the company, the service group, the technical group, the sales group, the product A team, and the product B team.

The interlevel assignment table 122 assigns a lower level in the enterprise hierarchy to a higher level in the hierarchy. In the interlevel assignment table 122, a first field identifies a higher level to which a lower level is assigned and a second field identifies the lower level. The labels "first" and "second" are used to distinguish between fields and not to specify a particular order for the fields. The lower levels may be assigned to a next higher level in the hierarchy or to each higher level in the hierarchy. The levels are identified in the interlevel assignment table 122 by the level IDs. For the call center 100 of FIG. 2, the service, technical, and sales group levels are assigned to the company level and the product A and B team levels are assigned to the sales group level.

The member tables 124 list in a first field all the members of the enterprise by a member ID. The members are those individuals of the enterprise on which functions of the system 10 are performed. Each member ID may be unique codes assigned by the performance evaluation system 10 when the member is first defined in the system 10.

In the member tables 124, a second field assigns the member to a level. Additional fields provide member attributes, such as first and last name, password, comments, and the like. In another embodiment, some or all of the member attributes may be stored in a separate table. For the call center 100 of FIG. 2, service agents (members 11 and 12) are assigned to the service group, technical agents (members 21 and 22) are assigned to the technical group, product A agents (members 31 and 32) are assigned to the product A team, and so on through product B agent (member 37) assigned to product B team.

The user table 126 lists all the users of the enterprise by a user ID. The users are people in the performance evaluation system 10 that perform the evaluations and that carry out the various tasks associated with the evaluation process such as defining all of the information needed to perform the evaluations. The user IDs may be any suitable identifier operable to uniquely identify the users. For the call center 100 of FIG. 2, the users are the system administrator (user 1), the service manager (user 10), the technical manager (user 20), the sales manager (user 30), the product A manager (user 31), and the product B manager (user 35).

The users-member table 128 cross-references user IDs with member IDs for users who are also members in the system 10. A user is also a member when the user reports to and is evaluated by a user higher in the enterprise hierarchy. For the call center 100 of FIG. 2, users 31 and 35 report to user 30. Accordingly, users 31 and 35 are cross-referenced as members in the users-member table 128.

The keyword table 130 lists all the keywords defined in the performance evaluation system 10 by a keyword ID. The keywords provide an easy way to classify members and other items of the performance evaluation system 10. The keywords can also be used to filter performance data for analysis or printing reports. The keyword IDs may be any suitable identifier operable to uniquely identify the keywords in the system 10. For the call center 100 of FIG. 2, the keywords may relate to the experience of an agent or to an agency from which the agent was hired. In this way, the performance of the agents may be compared based on their experience, the agency from which they were hired, and the like.

The keyword assignment table 132 assigns keywords to a member. In the keyword assignment table 132, a first field identifies a member by a member ID and a second field identifies a keyword assigned to the member by a keyword ID. One or more keywords may be assigned to each of the members. For the call center 100 of FIG. 2, if the service agent (member 11) is hired from the AA Agency and has two years' experience, keywords "Temp-AA Agency" and "2 years experience" are assigned to the service agent (member 11).

FIG. 4 illustrates details of the privilege tables 84. The privilege tables 84 assign each user a view and a class of services. The view specifies the levels and members of an organizational structure to which the user is allowed access. The class of services specifies services of the performance evaluation system 10 that the user is allowed to perform. The user has access privileges to perform services within the user's class of services for levels and members within the user's view. In this way, access privileges may be easily updated and maintained for the user in response to changes in allowed services or organizational structure. As a result, system administration cost is reduced.

Referring to FIG. 4, the privilege tables 84 include a user view table 140, a class of service assignment table 142, and a class of service template table 144. The user view table 140 specifies levels and members of the organizational structure to which the user is allowed access.

In the user view table 140, a first field identifies a user by user ID, a second field identifies a level or member associated with the user by the level or member ID, a third field identifies whether the item in the second field is a level or a member, and a fourth field enables the stored association between a user and a level or member in the user's view. Thus, in this embodiment, each user is associated with each level in the user's branch of the organizational structure and with members that report to the user. Each association between a user and a level or member may be enabled or disabled in the user's view and deselected using column 196 to be excluded from the user's view. In another embodiment, the user view table 140 may include only associations that are included in the user's view. In this embodiment, the fourth field is omitted.

For the call center 100 of FIG. 2, the system administrator (user 1) is associated with each level and member in the performance evaluation system 10. All of the associations for the system administrator are enabled and thus included in the system administrator's view to allow the system administrator to access each level and member of the system. The service manager (user 10) is associated with each level in the service manager's branch of the organizational structure and with members that report to the service manager. Thus, the service manager is associated with the company and service group levels and with the service agents (members 10 and 11) that report to the service manager. The associations between the service manager, the service level and the service agents are enabled to allow the service manager to access the level and members to configure and perform performance evaluations and other functions for the members and level. The association with the company level is not enabled and thus excluded from the service manager's view. Similarly, the product B manager (user 35) is associated with the company, sales group, and product A and B team levels and with the product B agents (members 36 and 37) that report to the product B manager. The associations with the product B team level and product B agents are enabled and included in the product B manager's view. Access to the company and the sales group levels are not enabled and thus excluded from the product B manager's view.

The user view table 140 may be manually populated by the system administrator or other user having suitable access privileges or may be generated based on the organizational structure defined by the organization tables 82. In the latter embodiment, a user assignment table is used to assign each user to a level. Based on that assignment, the organization tables 82 are interrogated to determine the levels within the user's branch of the organizational structure and the members that report to the user. This information is then used to populate the user view table 140. After the table is populated, associations are to be included in the user's view.

The class of service assignment table 142 assigns a class of service template to a user. In the class of service assignment table 142, a first field identifies the user by the user ID and a second field identifies the class of service template by a service template ID. The service template ID may be any suitable identifier operable to uniquely identify the service templates. Use of the service templates allows a particular class of services to be defined and reused for any number of users. For example, for the call center 100 of FIG. 2, group and team templates may be defined and associated with the group and team managers, respectively. Accordingly, the performance evaluation system 10 is more efficiently configured and administration cost is reduced.

The class of service template table 144 specifies the class of services for each service template. The class of service template table 144 includes a first field identifying a service template by the service template ID. Additional fields are included to specify the services to be included in the service template. The class of service template table 144 also includes a field for identifying a specific user by the user ID. This is used to generate a custom class of services for the user rather than a service template.

The services are predefined for the performance evaluation system 10. In a particular embodiment, the services may include administer productivity values, administer productivity data elements, access charting and reporting and administer filters, administer keywords, administer member information, administer class of service, administer evaluation expressions, configure data import settings, import data, administer organizational structure, perform reviews, add or modify reviews, delete reviews, administer performance areas and questions, browse my reviews, browse my performed reviews, browse all reviews, and administer user information.

FIG. 5 illustrates details of the plan tables 86. The plan tables 86 store questions, performance areas constructed of a set of questions, and guidelines constructed of a set of performance areas. The questions, performance areas, and guidelines are used to generate performance evaluations for members of the performance evaluation system 10. The use and sharing of questions by multiple performance areas and the use and sharing of performance areas by multiple guidelines allows evaluations to be efficiently defined and automatically generated. In addition, members in a group are evaluated against the same set of criteria to provide fairness and objectivity. As a result, managers can perform consistent, objective evaluations efficiently.

Referring to FIG. 5, the plan tables include a question table 150, an answer types table 152, a performance area table 154, a question assignment table 156, an expression table 158, an expression assignment table 160, a guideline table 162, and a performance area assignment table 164. The question table 150 defines questions that will be used in the performance evaluations. The question table 150 includes a first field identifying the question by a question ID, a second field providing a title for the question, a third field specifying text for the question, and a fourth field assigning a weight to the question. The question ID may be any suitable identifier operable to uniquely identify the questions.

For the call center 100 of FIG. 2, a first question may be directed toward schedule adherence and ask "How often does the agent work on the originally assigned shift?" and a second question may be directed toward promptness and ask "How often is the agent late for work?". Relative weights are assigned to the question depending on their importance to the enterprise. Thus, if promptness is more important to the enterprise than schedule adherence, the second question will be assigned a greater weight.

The answer types table 152 associates each question with a predefined answer type and attributes for that answer type. In the answer types table 152, a first field identifies the question by the.question ID, a second field identifies the answer type by an answer type ID, and a third field identifies the attributes for the answer type. The answer type IDs may be any suitable identifier operable to uniquely identify the answer types.

In a particular embodiment, defined answer types include yes/no, drop-down lists, horizontal scroll bar, edit box, and radio button answers. The yes/no answer type asks for either a yes or a no response. The drop-down list asks for one answer from a list of possible answers. The horizontal scroll bar answer type asks for an answer on a continuum for an overall rating. The edit box answer type asks for a numeric answer. The radio buttons ask for one answer from a list of possible answers. Attributes for the answer types include where appropriate, target values, labels, maximum and minimum values, and the like.

The performance area table 154 lists all the performance areas in the performance evaluation system 10 by a performance area ID. Each performance area is a grouping of questions that relates to a particular area of job performance. The performance area IDs may be any suitable identifier operable to uniquely identify the performance areas. For the call center 100 of FIG. 2, the performance areas may include on-call greeting and call closing.

The question assignment table 156 assigns questions to the performance areas. In the question assignment table 156, a first field identifies a performance area by a performance area ID and a second field identifies a question assigned to the performance area by a question ID. One or more questions may be assigned to each of the performance areas. In addition, questions may be reused between performance areas. For example, performance areas 2, 3 and 4 may each include question 3.

The expression table 158 lists in a first field all the expressions in the performance evaluation system 10 by an expression ID. The expression IDs may be any suitable identifier operable to uniquely identify the expressions. A second field specifies a mathematical equation for the expression. The equation may contain data elements, numeric values, mathematical operations or mathematical functions. In a particular embodiment, the mathematical operations include addition, subtraction, multiplication and division. The mathematical functions include sum, average, minimum, maximum, and peak.

The expression assignment table 160 assigns expressions to the performance areas. When associated with a performance area, the expressions are used to compute a productivity score for that performance area. In the expression assignment table 160, a first field identifies a performance area by a performance area ID and a second field identifies an expression assigned to the performance area by an expression ID. One or more expressions may be assigned to each of the performance areas. In addition, an expression may be reused between performance areas. For example, performance areas 1 and 6 may each include expression 1.

The guideline table 162 lists all the guidelines in the performance evaluation system 10 by a guideline ID. Each guideline combines one or more performance areas that are of interest for a particular evaluation. The guideline IDs may be any suitable identifier operable to uniquely identify the guidelines. For the call center 100 of FIG. 2, the performance areas may include technical group, product A team, product B team, and the like.

The performance area assignment table 164 assigns performance areas to the guidelines. In the performance area assignment table 164, a first field identifies a guideline by a guidelines ID and a second field identifies a performance area assigned to the guidelines by a performance area ID. One or more performance areas may be assigned to each of the guidelines. In addition, performance areas may be reused between guidelines. For the call center 100 of FIG. 2, for example, the service, technical, product A team, and product B team guidelines may each include performance area 1.

FIG. 6 illustrates details of the productivity tables 90. The productivity tables 90 store productivity data for members of the performance evaluation system 10. The productivity data is used by the expressions in the performance areas to calculate productivity scores.

Referring to FIG. 6, the productivity tables 90 include a data element table 166 and a productivity table 168. The data element table 166 lists all the data elements in the performance evaluation system 10 by a data element ID. The data elements are items of information used to measure the productivity of members in the performance evaluation system 10. The data element IDs may be any suitable identifier operable to uniquely identify the data elements.

The productivity table 168 includes a first field identifying members with a member ID, a second field providing dates for the records, a third field identifying the data element for the record by a data element ID, and a fourth field storing the value of the data element.

FIG. 7 illustrates details of the data import tables 88. The data import tables 88 import productivity data into the performance evaluation system 10 from external devices and automatically insert it into the production table. As a result, the evaluation process is streamlined by having data in a centralized location for data analysis.

Referring to FIG. 7, the data import tables 88 include configuration tables 170, an import template assignment table 172, and an import template table 174. Each configuration table 170 provides information for identifying and mapping data from the delimited file 60 to the productivity table 90.

The configuration table 170 includes a first field identifying a column in the delimited file 60 containing a data item corresponding to a data element, a second field identifying a data name, a third field identifying a data type, a fourth field identifying a data format, and a fifth field mapping the data item to the data element in the productivity table 90. In a particular embodiment, the data types include identity, date, duration and numeric types. An identity column provides identifying information such as a name or code. The date column provides the date of the information. The duration column shows an amount of time for the information. A numeric column contains a value.

The import template assignment table 172 assigns an import template to a configuration. In the import template assignment table 172, a first field identifies the configuration by a configuration ID and a second field identifies the import template by an import template ID. The configuration and import template IDs may be any suitable identifiers operable to uniquely identify the configurations and import templates, respectively. Use of the import templates allows a process for imported data to be defined and reused for any number of configurations. Accordingly, the performance evaluation system 10 is more efficiently configured and administration cost is reduced.

The import template table 174 specifies preprocessor and other information for importing the data file 56. The import template table 174 includes a first field identifying the import templates by the import template IDs. A second field identifies a preprocessor, if any, to be applied to the data file 56 to generate the delimited file 60. A third field identifies the delimiter used in the delimited file 60.

In operation, productivity data is imported by selecting a configuration, selecting users to determine how the data will be applied (members assigned to selected users receive the productivity data), specifying how the date will be determined, selecting the data file 56 to import by selecting a drive and the file name, specifying how to match productivity data to members (by name or code), and selecting whether or not to replace existing productivity information. In response to the import request, the data importer 48 retrieves the requested data file 56 and if the import template associated with the configuration requests a preprocessor 52, applies the preprocessor 52. Using the delimiter information in the import template for the configuration and the mapping information in the configuration table, the data importer 48 inserts the productivity data into the productivity tables 90 for members in the user's view.

Figure 8:
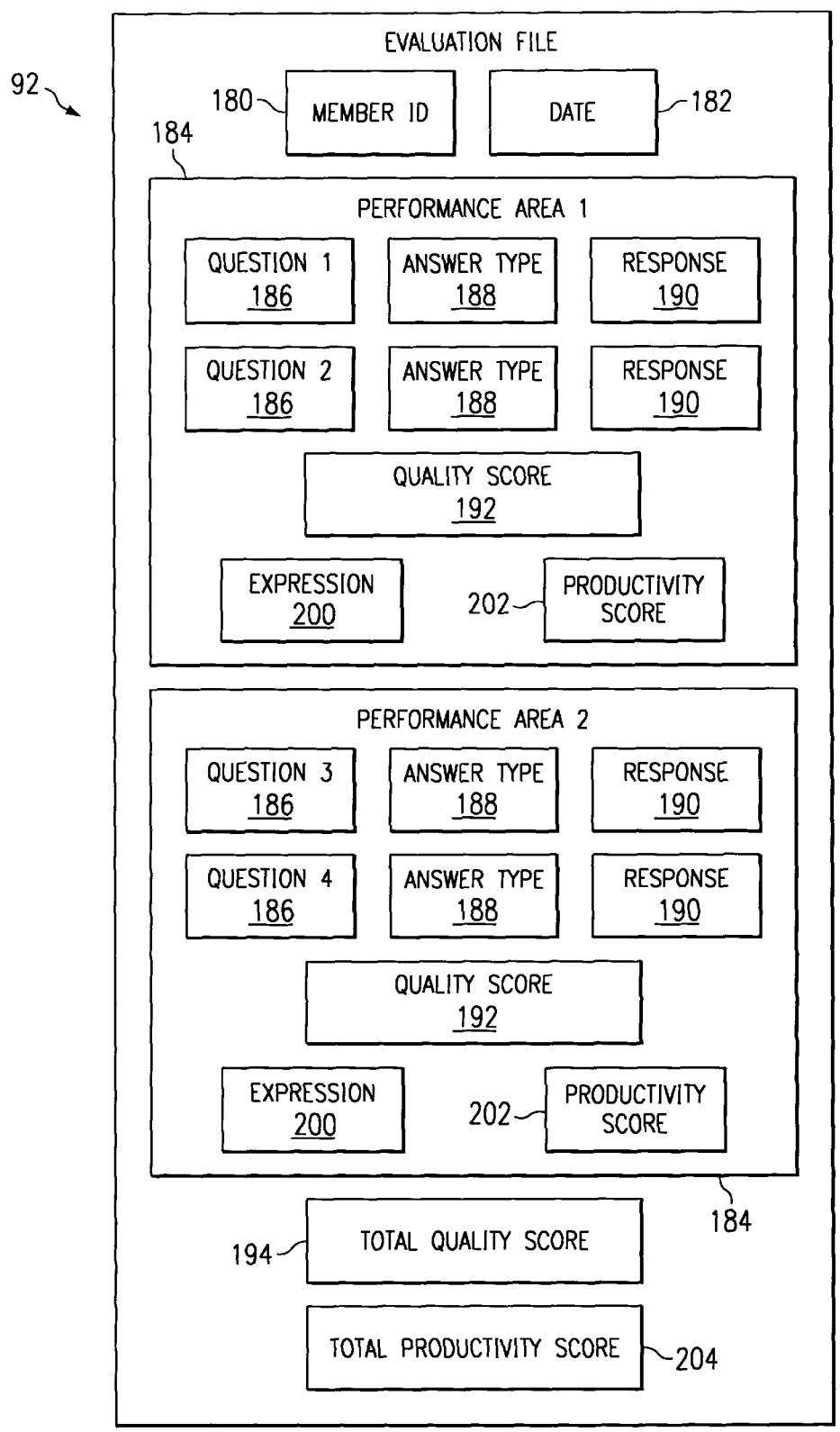
FIG. 8 illustrates details of an evaluation file stored in the evaluation tables of FIG. 1 in accordance with one embodiment of the present invention.

FIG. 8 illustrates details of an evaluation stored in the evaluation tables 92. As previously described, the evaluation is automatically generated based on guidelines, performance areas, and questions selected for the evaluation.

Referring to FIG. 8, the evaluation includes a member ID 180 for whom the evaluation was completed, a date 182 on which the evaluation was completed, and a plurality of performance areas 184. The performance areas 184 each include one or more questions 186 and their associated answer types 188. As the evaluation is completed, responses 190 are stored for each question and used to calculate a quality score 192 for the performance area 184. The quality score 192 is a measure of "goodness" for the member's performance.

The quality score 192 for a performance area 184 is calculated based on the relative weight of the questions 186 in the performance area 184. The score of responses 190 to all questions 186 in the performance area 184 are summed and divided by the sum of the relative weights. This produces a quality score 192 for the performance area 184. Mathematically, this is expressed in the following way:

$$\frac{\sum_{i=1}^{n}\left(\left(\frac{achieved_i - worst_i}{target_i - worst_i}\right) * relWeight_i\right)}{\sum_{i=1}^{n} relWeight_i}$$

where n is the number of applicable questions in the performance area i ranges over the answered questions in the performance area achieved is the number of points the member actually earned for question i $worst_i$ is the lowest possible score that can be assigned to question i $relweight_i$ is the relative weight for question i target; is the target value for question i After the quality scores 192 have been calculated for the performance areas 184 in an evaluation 92, the quality scores 192 are summed and divided by the sum of the relative weight for all questions to derive a total evaluation quality score 194. Mathematically, this is expressed as:

$$\frac{\sum_{i=1}^{n} qScore_i}{\sum_{i=1}^{n} relWeight_i}$$

where n is the number of applicable questions in the evaluation i ranges over the applicable questions in the evaluation $qScore_i$ is the q-score for question i $relweight_i$ is the relative weight for question i The performance areas 184 may also each include one or more expressions 200 to calculate a productivity score 202. As previously described, the expression 200 is a user-defined formula to calculate a measure of productivity against a target score.

The calculation of productivity score 202 for a performance area 184 is a direct computation of the expression 200 using the productivity data. After the productivity score has been calculated for all performance areas 184 that have an associated expression 200, the performance area productivity scores 202 are tallied to derive a total productivity score 204 for the evaluation. Mathematically, this is expressed as a median score of all performance area productivity scores:

$$\frac{\sum_{i=1}^{n} \frac{achieved_i}{target_i}}{n}$$

where n is the number of performance areas in the evaluation having an associated evaluation expression that can be successfully calculated i ranges over the performance areas in the evaluation $achieved_i$ is the number of points the member actually earned for performance area i $target_i$ is the target value for performance area i In another embodiment, the productivity scores for the different performance areas 184 may be weighted based on importance. In this embodiment, the overall productivity score for the evaluation is calculated by the following equation:

$$\frac{\sum_{i=1}^{n} w_i \frac{achieved_i}{target_i}}{n}$$

where n is the number of performance areas in the evaluation having an associated evaluation expression that can be successfully calculated i ranges over the performance areas in the evaluation $w_i$ is the importance factor associated with performance i's p-score achieved is the number of points the member actually earned for performance area i target, is the target value for performance area i In operation, the user selects the member 180 and an existing guideline or one or more performance areas 184 for the evaluation. The evaluation is then automatically generated. Quality scores are generated based on the user's responses; Productivity scores are generated based on productivity data.

FIG. 9 illustrates details of the filter tables 94. The filter allows the user to define certain criteria for reporting and charting. This criteria is used to sort the data and display results in the charts and reports.

Referring to FIG. 9, the filter tables 94 include a first field identifying the filters with a filter ID. The filter ID may be any suitable identifier operable to uniquely identify the filters. A second field indicates whether the filter includes plan criteria. Each category of plan criteria is specified by a separate look-up table. In a particular embodiment, the categories include evaluations, guidelines, performance areas, questions, expressions, and evaluators. In this embodiment, an evaluation filter table associates the filter with evaluations, a guideline filter table associates the filter with an identified guideline, a performance area filter table associates the filter with a specified performance area, a question filter table specifies questions for the filter, an expressions filter table specifies expressions for the filter and an evaluators filter table specifies evaluators for the filter. Each of these filter's tables include a first field identifying the filter with a filter ID and a second field identifying the relevant evaluation, guideline, performance area, question, expression or evaluator for the filter.

Returning to the filter table 94, a set of date fields specify date(s) for the filter. The date may be a current day, current month, current quarter, current week, current year, previous day, previous month, previous quarter, previous week, previous year, or be otherwise defined by the user. A set of data fields specify data for the filter. The data may be members, all members, or member levels. A set of averages fields specify averages for the filter. The averages may be daily, weekly, bi-weekly, or monthly. A set of sample size fields specify sample size for the filter. The sample size allows data to be filtered based on any sample size entered by the user. A keyword field indicates whether the filter includes any keywords. Keywords are associated with the filter in a separate look-up table as previously described for plan criteria.

Thus, evaluators, guidelines, performance areas, questions, expressions, dates, data, averages, keywords, sample size, and other criteria may be specified for the filter. As a result, a user may narrowly define information and obtain meaningful results.

Although the present invention has been described with several embodiments, various changes and modifications may be suggested to one skill in the art. It is intended that the present invention encompass such changes and modifications as fall within the scope of the appended claims.

What is claimed is:

1. A method for defining an organizational structure of an enterprise in a computerized performance evaluation system, comprising:

storing a plurality of user-defined levels within a computerized performance evaluation system;

storing a user-defined hierarchy for the levels within the performance evaluation system by storing an assignment for each lower level in the hierarchy to a higher level in the hierarchy;

storing information identifying a plurality of user-defined members within the performance evaluation system;

assigning each member to a level within the hierarchy to define the organizational structure of the enterprise within the performance evaluation system;

storing a plurality of user identifiers within the performance evaluation system, the user identifiers associated with particular users that perform evaluations of particular ones of the user-defined members;

generating a first user view for a first user, the first user view specifying the particular members to which the first user is allowed access;

generating a second user view for a second user, the second user view specifying the particular members to which the second user is allowed access;

assigning first access privileges to the first user, wherein the first access privileges allow the first user to perform services for user-defined members specified in the first user view; and assigning second access privileges to the second user, wherein the second access privileges allow the second user to perform services for user-defined members specified in the second user view.

2. The method of claim 1, wherein the user-defined levels are stored by listing the levels in a database table.

3. The method of claim 1, wherein each lower level is assigned to at least a next higher level in the hierarchy.

4. The method of claim 1, further comprising storing the assignments associated with the user-defined hierarchy in a database table.

5. The method of claim 1, wherein the information identifying the user-defined members is stored by listing the members in a database table.

6. The method of claim 1, wherein the members are each assigned to a level by storing a user-assigned level for the member.

7. The method of claim 6, wherein the user-assigned levels are stored in a database table.

8. The method of claim 6, wherein each of the user-defined levels, the user-defined hierarchy, and the user-assigned levels are stored in separate database tables.

9. The method of claim 1, wherein the information identifying the user-defined members is stored by listing the members in a database table and the members are each assigned to a level by storing a user-assigned level for the member in the database table.

10. The method of claim 1, wherein the access privileges comprise classes of services associated with each user, the classes of services indicating particular services associated with the evaluations that a specified user is allowed to perform.

11. A system for defining an organizational structure of art enterprise in a computerized performance evaluation system, comprising:

a first database table operable to store a plurality of user-defined levels in a computerized performance evaluation system;

a second database table operable to store a user-defined hierarchy for the levels in the performance evaluation system by storing an assignment for each lower level in the hierarchy to a higher level in the hierarchy;

a third database table operable to store information identifying a plurality of user-defined members, each member assigned to a level in the performance evaluation system;

a fourth database table operable to store a plurality of user identifiers associated with particular users that perform evaluations of particular ones of the user-defined members;

the performance evaluation system operable, for at least one of the users, to generate a user view for the user, the user view specifying the particular members to which the user is allowed access; and the fourth database table being firer operable to store access privileges assigned to the at least one user, wherein the access privileges allow the at least one user to perform services for user-defined members specified in the user view.

12. The system of claim 11, further comprising the third database table operable to store a user-assigned level for each of the members.

13. The system of claim 11, wherein each lower level is assigned to a next higher level in the hierarchy.

14. The system of claim 11, wherein each lower level is assigned to each higher level in the hierarchy.

15. A performance evaluation system, comprising:

a memory operable to store:
a plurality of user-defined levels;
a user-defined hierarchy for the levels by storing an assignment for each lower level in the hierarchy to a higher level in the hierarchy;
information identifying a plurality of user-defined members, each member assigned to a level;
a plurality of user identifiers associated with particular users that perform evaluations of particular ones of the user defined members; and a processor coupled to the memory and operable to:
generate a first user view for a first user, the first user view specifying the particular members to which the first user is allowed access;
generate a second user view for a second user, the second user view specifying the particular members to which the second user is allowed access;
assign first access privileges to the first user, wherein the first access privileges allow the first user to perform services for user-defined members specified in the first user view; and
assign second access privileges to the second user, wherein the second access privileges allow the second user to perform services for user-defined members specified in the second user view.

16. The performance evaluation system of claim 15, wherein the memory is further operable to store a user-assigned level for each of the members.

17. The performance evaluation system of claim 15, wherein each lower level is assigned to a next higher level in the hierarchy.

* * * * *